United States Patent [19]
Farkas

[11] Patent Number: 4,467,284
[45] Date of Patent: Aug. 21, 1984

[54] RADIO FREQUENCY STORAGE PULSER

[76] Inventor: Zoltan D. Farkas, 203 Leland Ave., Menlo Park, Calif. 94025

[21] Appl. No.: 267,499

[22] Filed: May 27, 1981

[51] Int. Cl.³ .......................... G01S 7/28; H03K 5/01; H05H 7/02
[52] U.S. Cl. ...................................... 328/61; 307/106; 328/65; 332/9 R; 343/17.1 R; 375/52; 375/67
[58] Field of Search ................. 332/9 R, 9 T; 375/22, 375/23, 52–57, 67; 307/106, 108; 333/258, 262; 328/28, 59–61, 65; 343/17.1 R, 17.1 PF

[56] References Cited

U.S. PATENT DOCUMENTS 3,349,342 10/1967 Garver ................................. 332/9 R
3,803,513 4/1974 Oya et al. ............................ 333/122

OTHER PUBLICATIONS

Farkas, "RF Energy Compressor", 1980 IEEE MTT-S International Microwave Symposium Digest, Washington, DC, May 28–30, 1980.

Primary Examiner—Siegfried H. Grimm
Attorney, Agent, or Firm—Townsend & Townsend

[57] ABSTRACT

A system for converting low amplitude continuous wave radio frequency energy into periodic high amplitude radio frequency, pulsed energy with a conversion efficiency approaching 100%. The invention uses radio frequency energy storage devices together with a network which separates the energy flowing towards and away from the storage devices. The phase of the input radio frequency energy is periodically changed between 0° and 180°. Synchronously with this phase change, the effective apertures of the storage devices (i.e. their external quality factors) are changed between two discrete values. The energy conversion efficiency is a maximum when a fixed relationship exists between the ratio of the two discrete values of the external quality factors and the ratio of the period between pulses and pulse durations.

7 Claims, 11 Drawing Figures

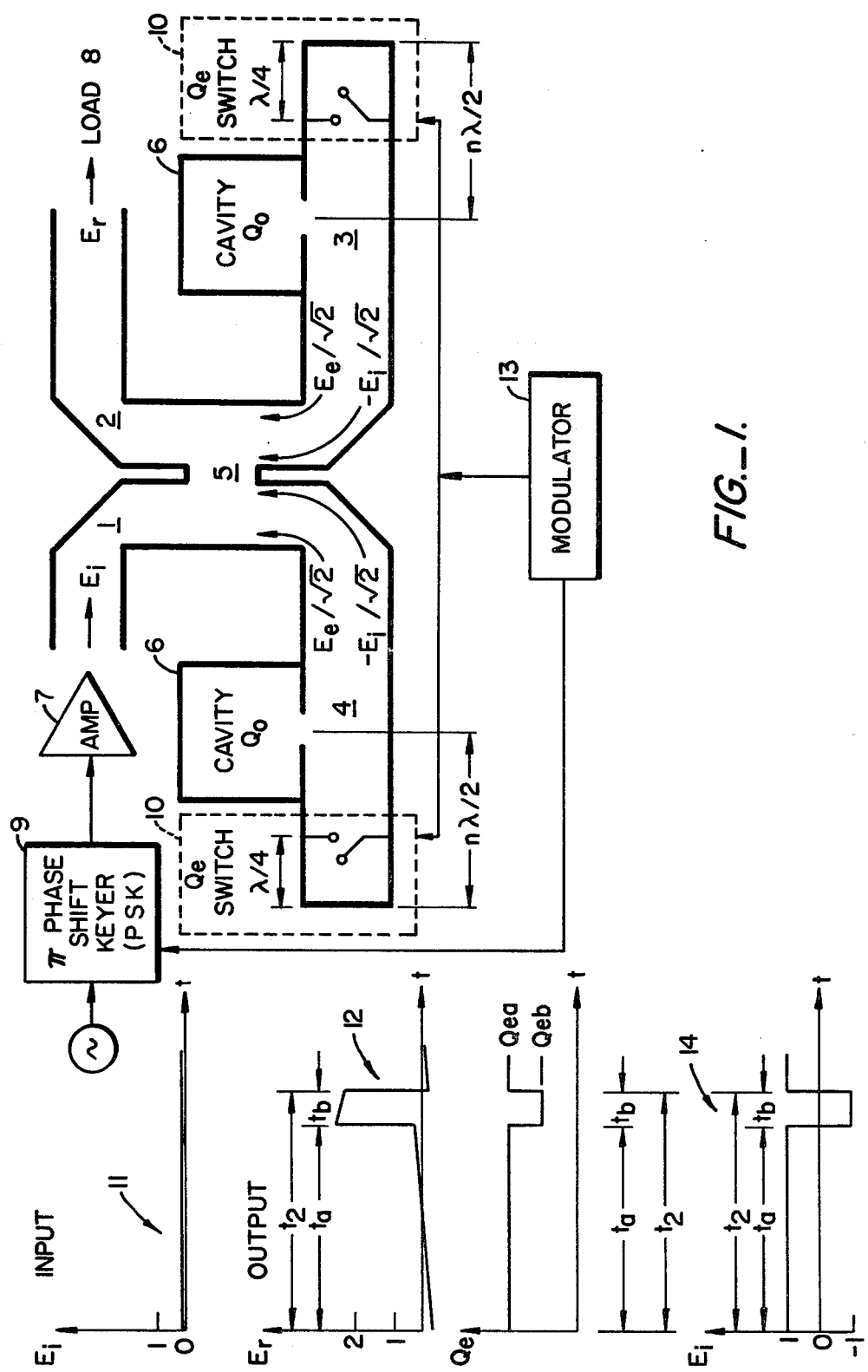
FIG._1.

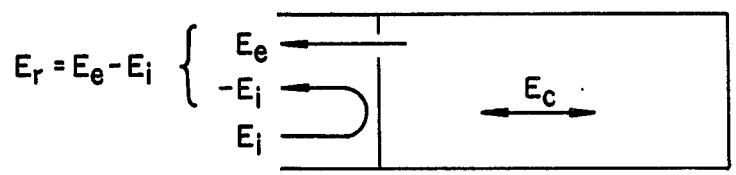
FIG._2.
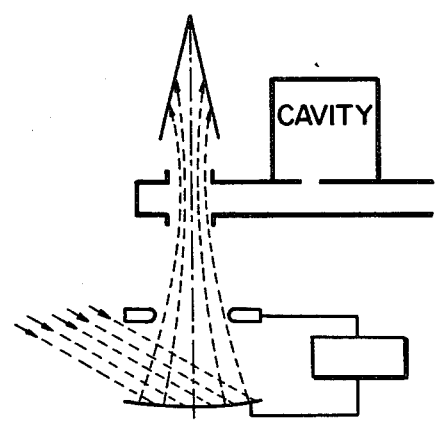
FIG._4.
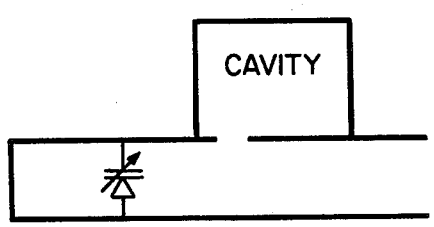
FIG._5A.
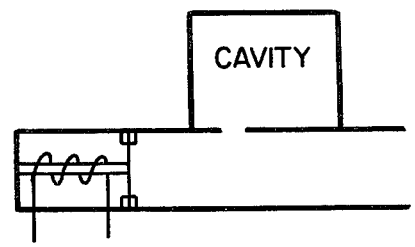
FIG._5B.

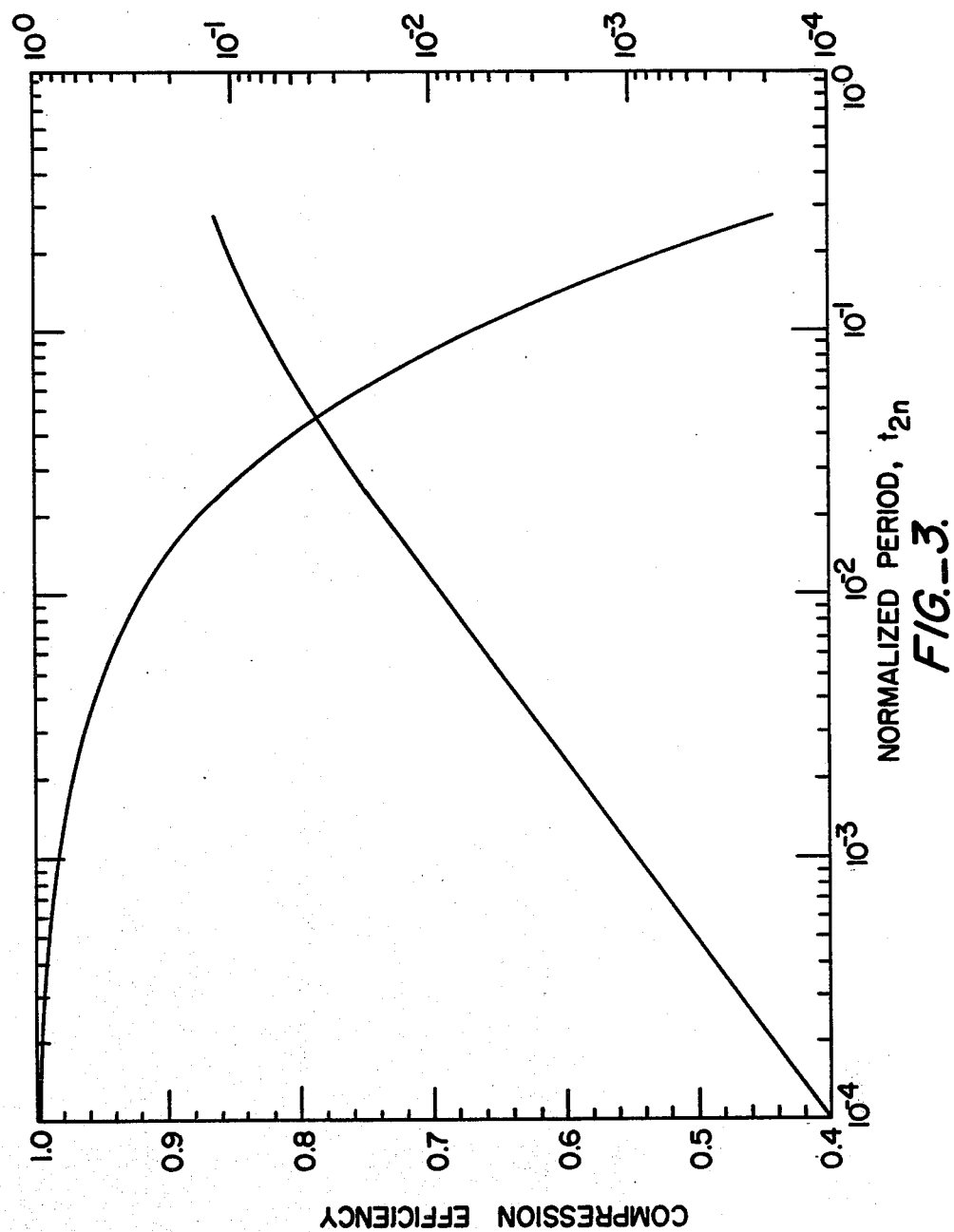
FIG._3.

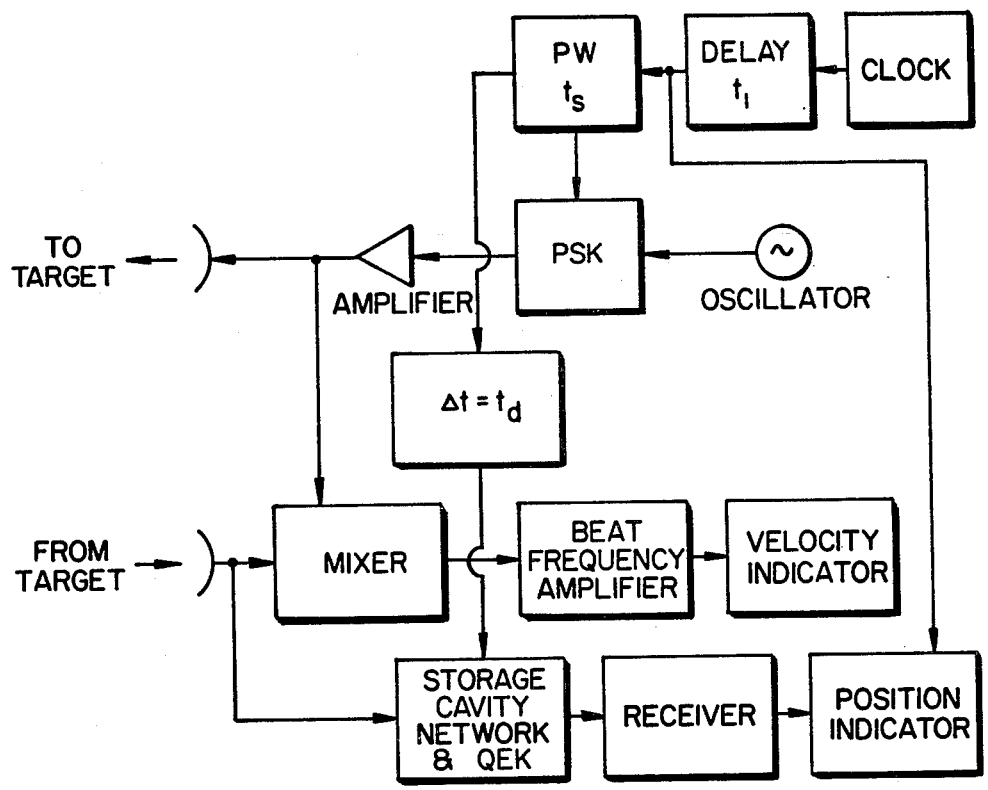
*FIG._6A.*
*FIG._6B.*
*FIG._6C.*
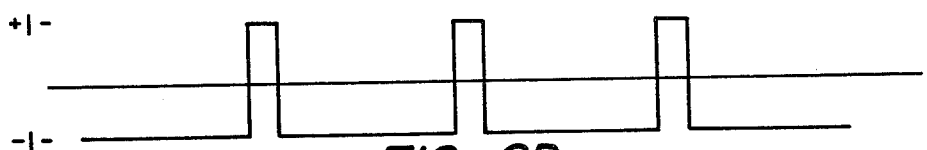
*FIG._6D.*
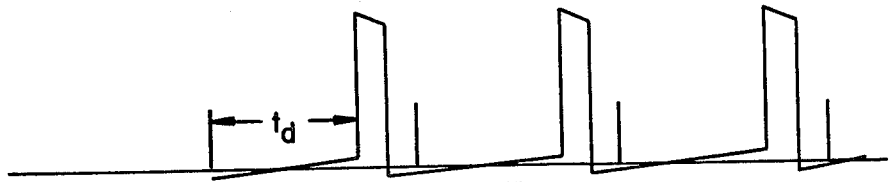
*FIG._6E.*

RADIO FREQUENCY STORAGE PULSER

BACKGROUND OF THE INVENTION

There are many applications where we need a train of radio frequency (rf) pulses, such as charged particle accelerators, radar and communication. Also, we need extremely narrow pulses with extremely high peak power for initial fusion. Usually the energy is built up in between pulses and is stored in the static electric field of capacitors, which discharge partially, as in a hard tube modulator, or completely, as in a line-type pulser, into an rf amplifier, which converts the stored electrostatic energy into rf energy. The conversion from direct current (dc) to rf takes place at high level and therefore is inefficient. The peak power is limited by the characteristics of the amplifier. The peak power of an electrostatic pulser can be increased by pulse compression using frequency modulation and a dispersive structure or using storage cavities with a phase shift keyer as described in U.S. Pat. No. 4,009,444. However, this requires both an electrostatic modulator and a pulse compression system, and the disadvantage of converting direct current energy into radio frequency at high level still remains. This invention, the radio frequency storage pulser (RASP), compresses into a narrow pulse the energy contained not in a wider pulse but the energy contained in a period.

SUMMARY OF THE INVENTION

It is the object of the invention to provide a pulser that is more efficient, more versatile and capable of sharper rise and fall times, higher repetition rate and higher power output than the presently used electrostatic storage pulsers. With the radio frequency storage pulser, the ac line energy is converted into low-level continuous wave radio frequency energy. During the first part of a period the rf is accumulated and stored in radio frequency storage devices which, like a capacitor in a hard-tube modulator, act as a flywheel. During charging the cavities accept nearly all the continuous wave energy flowing into the energy storage network. Each cavity accumulates energy in between pulses and delivers it during the pulse. Then the accumulated energy together with the continuous wave energy available during discharge is delivered into a load. The control that tells the cavity when to accept and when to deliver energy is a 180° phase shift keyer (PSK). Another switch (a QEK) synchronously changes the external Q ($Q_e$) of the cavity and determines the rate of energy acceptance and delivery. There are two loss mechanisms that prevent the attainment of 100% conversion efficiency; one, energy loss due to dissipation because a cavity has a finite unloaded quality factor; and two, energy loss due to reflection because the reverse field must vary during charging and therefore cannot be zero at all times during charging. We arrange the duration and rate of charging and discharging to maintain an average field level in the cavity that minimizes total loss.

BRIEF DESCRIPTION OF THE DRAWINGS

FIG. 1 is a diagram of a specific embodiment of the radio frequency storage pulser.

FIG. 2 is a diagram illustrating the storage cavity fields.

FIG. 3 shows a plot of compression efficiency and a plot of pulse energy attainable with a cavity with a given unloaded quality factor and at a given frequency.

FIG. 4 shows a possible design of a low loss ON/OFF switch that could function in a superconducting environment.

FIGS. 5a and 5b are schematics of specific $Q_e$ switch designs.

FIG. 6a is a schematic diagram of RASP adapted to a RADAR system.

FIGS. 6b, 6c, 6d and 6e are a series of diagrams showing waveforms that occur in the arrangement of FIG. 6a.

DESCRIPTION OF AN EMBODIMENT

Although there can be many embodiments of the invention, we will consider a specific embodiment shown in FIG. 1. A brief description of the components follows. This embodiment consists of a 3 dB hybrid 5 with storage cavities 6 connected to each of its isolated ports 3 and 4. Of the two remaining isolated ports, port 1 is connected to a continuous wave amplifier 7 and port 2 is connected to a suitable load 8. The power entering port 1 flows toward the cavities 6 and the power traveling away from the cavities enters port 2 and hence flows into load 8. The phase of the continuous wave radio frequency energy is modulated with a 180° phase shift keyer (PSK) 9 so that it is zero during charging time, $t_a$, and 180° during discharge time, $t_b$. The amplifier output is a 180° phase modulated wave which can be considered a radio frequency wave whose amplitude changes sign, as indicated in waveform 14. Also the external Q's are varied with $Q_e$ switches (QEK's) 10 between the value $Q_{ea}$ during $t_a$ and $Q_{eb}$ during $t_b$. The modulator 13 is a video pulse source which provides the appropriate signals to actuate synchronously phase shift keyer 9 and $Q_e$ switches 10. The modulation period is $t_2 = t_a + t_b$. An example of a $Q_e$ switch is a section of transmission line terminated with a short an integral number of half wavelengths from the cavity opening and with an ON/OFF switch located an odd number of quarter wavelengths from the short. The ON/OFF switch can be a diode (FIG. 5a), a tube of low pressure gas (FIG. 5b), or an electron beam (FIG. 4). The hole size determines $Q_{eb}$ and the electrical length of the section determines $Q_{ea}$. A short time after the phase and $Q_e$ modulation have been applied, the field inside the cavity attains a given average level. The output is nearly zero during $t_a$ and during $t_b$ it is nearly equal to $t_2/t_b$ times the continuous wave amplifier output amplitude. Thus, the continuous wave input amplitude 11 has been transformed into periodic pulses 12.

THEORY

Define the ratio of the energy in the pulse to the energy in a period as the compression efficiency, $C_e$, the ratio of period to pulse width, $(t_a + t_b)/t_b$, as the compression factor, $C_f$, the energy contained in the pulse as $U_{rb}$, and the ratio of pulse to continuous wave power as $P_p$. If the compression were 100% efficient then $P_p$ would equal $C_f$. For a given $t_a$, $t_b$, $Q_o$, there is a $Q_{ea}$ and $k = Q_{ea}/Q_{eb}$ that will yield a maximum $C_e$, and a maximum $P_p$. To determine these we first derive the fields of a single cavity when the amplitude waveform of the rf is incident upon it and its $Q_e$'s vary according to the invention as indicated in FIG. 1. The results are also valid for a system of cavities such as shown in FIG. 1, where, as previously stated, the power traveling away from the cavities is separated from the incident power and channeled into a load.

Let $P_i=E_i^2$=power traveling toward the cavity, $P_e=E_e^2$=power emitted from the cavity, $P_r=E_r^2$=power traveling away from the cavity, $P_d=E_d^2$=power dissipated in the cavity, $U=E_c^2/\omega$=energy stored in the cavity and $Q_o$, $Q_e$ the unloaded and external quality factors of the cavity respectively. The fields are indicated in FIG. 2. The values of the fields during each interval are obtained as follows. We equate the instantaneous incident power minus the reverse power to the power dissipated plus rate of energy change in the cavity and obtain $$E_i^2 - (E_e - E_i)^2 = P_d + dU/dt. \quad (1)$$

Using
$$E_e^2 = \omega U/Q_o, \; E_d^2 = \omega U/Q_e, \quad (2)$$
we obtain $$T_c dE_c/dt + E_c = E_{cf}, \quad (3)$$

whose solution is $$E_c = E_{cf} + (E_{ci} - E_{cf})e^{-t/T_c} \quad (4)$$

where $$T_c = 2qQ_e/\omega, \; q = 1/(1+Q_e/Q_o), \; E_{cf} = 2qQ_e^{\frac{1}{2}}E_i, \quad (5)$$

$T_c$ is the cavity time constant, $E_{ci}$ is the initial field in the cavity at $t=0$, $E_{cf}$ is the ultimate or steady state field in the cavity, $\omega=2\pi f$ where f is the rf frequency. The other fields are given by:

$$E_d = E_c/Q_o^{\frac{1}{2}}, \; E_e = E_c/Q_e^{\frac{1}{2}}, \; E_r = E_e - E_i. \quad (6)$$

Assume that the absolute value of $E_i$ is unity. Impose the periodicity condition, i.e., the value of $E_c$ at the beginning of interval $t_b$ equals to $E_c$ at the end of interval $t_a$, and vice versa (See FIG. 2a) and obtain $$E_{cal} = E_{caf} + (E_{cai} - E_{caf})e^{-\tau_a} = E_{cbi} \quad (7)$$

$$E_{cbl} = E_{cbf} + (E_{cbi} - E_{cbf})E^{-\tau_b} = E_{cai} \quad (8)$$

Solving the above two equations simultaneously we obtain $$E_{cai} = \frac{E_{cbf}(1-e^{-\tau_b}) + E_{caf}e^{-\tau_b}(1-e^{-\tau_a})}{1-e^{-(\tau_a+\tau_b)}} \quad (9)$$

$$E_{cbi} = \frac{E_{caf}(1-e^{-\tau_a}) + E_{cbf}e^{-\tau_a}(1-e^{-\tau_b})}{1-e^{-(\tau_a+\tau_b)}} \quad (10)$$

where $$\tau_a = t_a/T_{ca} = \omega t_a/2q_a Q_{ea},$$

and $$\tau_b = t_b/T_{cb} = \omega t_b/2q_b Q_{eb};$$

$E_{cal}$, $E_{cbl}$ are the values of $E_c$ at the ends of intervals $t_a$, $t_b$ respectively.

We now have the initial and ultimate value of $E_c$ during both $t_a$ and $t_b$. $E_c$ is proportional to the square root of the energy stored in a cavity. Hence, we have $E_c$ as a function of time during each interval. $E_d$, $E_e$, U and $P_d$ are obtained from $E_c$ as indicated previously. Now we can solve for $$C_e = \int_0^{t_b} E_{rb}^2 dt \quad (11)$$

in terms of $t_a$, $t_b$, $Q_o$, $Q_{ea}$, and k. We could maximize $C_e$ with respect to $Q_{ea}$ and k. But the expression for $C_e$ is very complicated and therefore as a first try we'll obtain the value of $Q_{ea}$ and k that maximize $C_e$ for the limiting case where $t_2$ is a small fraction of $Q_o/\omega$. It can be shown that during charging the rate of energy increase in a cavity is maximum and equals q when $E_e$ equals q. We anticipate that the mean value of $E_e$ will be q and hence the fraction of energy dissipated $$U_d = E_d^2 = qQ_{ea}/Q_o. \quad (12)$$

$E_r$ is nearly linear during $t_a$ and is nearly zero at $t_a/2$ and hence the fraction of energy reflected during $t_a$ is $U_{ra}' = (1/48)(\omega t_a/Q_{ea})^2$. We equate the dissipation loss to the reflected loss and obtain $Q_{ea} = 0.35(\omega^2 t_a^2 Q_o)^{0.333}$. We substitute in the expression for $E_{eai}$, unity for exp $(-\tau)$ and $\tau$ for $1-\exp(\tau)$ and equate it to q and obtain $$C_f = qk^2 + 2k + 1$$

$$k = [-1 + (1+q(C_f-1))^{\frac{1}{2}}]/q$$

Substituting the values of $Q_{ea}$ and k obtained in the case for low loss into the expression for $E_{rb}$, we obtain the energy in the pulse $$U_{rb} = \int_0^{t_b} E_{rb}^2 dt.$$

The energy in a period is $t_2$, hence $C_e = U_{rb}/t_2$. It turns out that the values of $Q_{ea}$ and k that maximize $C_e$ and $U_{rb}$ at low loss also maximize it at higher losses. $C_e$ is a function of the normalized period $t_{2n} = t_2 f/q_o$. The actual energy is $U_{rba} = U_{rb} P_i$, and the actual pulse power $P_{pa} = U_{rba}/t_b$. The normalized pulse energy is $U_{rbn} = U_{rbf}/Q_o = P_{pa} t_b (f/Q_o)/P_i$. Plots of maximized $C_e$ and of $U_{rbn}$ vs $t_{2n}$ are given in FIG. 3. For example, if $t_2=2$ $\mu$sec, $f=286$ MHz, $t_b=0.1$ $\mu$sec, and $P_i=0.1$ MW, $2.86\times10^5$, then $t_{2n}=2\times10^{-2}$ and from the plot $C_e=0.875$, $U_{rbn}=1.75\times10^{-2}$ Watt$^{-1}$. Thus $P_{pa}=U_{rbn}(Q_o/f)P_i/t_b=1.75$ MW. The $Q_o$ of a spherical cavity operating in the TE$_{nop}$ mode is $Q_o=15.15Rf^{\frac{1}{2}}$, where R is the radius of the sphere. The rise and fall times of the PSK and QEK switches have to be small compared with $t_b$.

One can increase $Q_o$ by several orders of magnitude by making the cavity of a material that superconducts at low temperatures and cool the cavity to those temperatures. But then one has to include the power into the refrigerator in the efficiency calculations since that power could be converted to radio frequency energy. A superconducting system is characterized by an improvement factor $I_f$, a refrigeration factor $R_f$, and an ac to rf efficiency $E_{arf}$. The efficiency when the cavities are superconducting, $C_{es}$, is $C_e$ multiplied by the refrigeration efficiency $1/(1+U_{dp}R_f E_{arf})$, where $U_{dp}$ is the fraction of incident power dissipated in the cavity. The peak stored energy is $C_{es}t_2$. The $Q_{ea}$ that maximizes $C_{es}$ is given by $Q_{ea}=0.35[\omega^2 t_a^2 Q_o I_f/(1+E_{arf}R_f)]^{\frac{1}{3}}$. If we go from copper cavities to superconducting cavities then the period that can be compressed with the same efficiency is multiplied by a factor $S_f = I_f/(1 + E_{arf} R_f)$. The pulse energy is also multiplied by $S_f$. Niobium cavities operating at 1.8 k have an $I_f = 10^6$ and $R_f = 1000$. Typically, ac can be converted to 0.1 MW rf with $E_{arf} = 0.63$. Thus, $S_f = 1590$, and with the same size cavities as in the previous example we can have a 1 μsec 278 MW pulse.

The QEK degrades $Q_o$ and reduces the efficiency by its insertion loss. This is most important with superconducting cavities because the energy has to be removed at low temperatures. Also, the energy needed to actuate the QEK has to be considered. The QEK must be extremely low loss in order not to degrade $Q_o$. A conceptual design of such a QEK is shown in FIG. 4.

There are two important points. (1) $C_f$ can approach unity and therefore, $t_a$ can approach zero. (2) When $C_f = 4$, then $k = 1$ and there is not need for a $Q_e$ switch. This is significant because the 180° phase shift keyer can be placed before the amplifier as shown in FIG. 1, and operate at low power. Thus, high-power compressed pulses can be generated, albeit only with a compression factor of approximately 4, with only a low-power 180° phase shift keyer.

For a given $Q_{ea}$, $Q_{eb}$ and $t_b$ there is $C_f$ that maximizes $C_e$. As $C_f$ increases $C_e$ decreases but the pulse power increases, as $C_f$ decreases both $C_e$ and pulse power decrease.

ADVANTAGES OF RASP

Transistor amplifiers have peak power limitations. With the transistor amplifier as part of a RASP system one can reach the peak-power limitations imposed by diodes which are several orders of magnitude greater than those of a transistor. RASP is especially advantageous at levels of many megawatts pulse power where line-type pulsers and klystron amplifiers are used. RASP has the following advantages over a line-type pulser.

HIGHER EFFICIENCY

The efficiency of a klystron increases as its perveance, the ratio of power to voltage to the 5/2, decreases. Hence, low power cw klystrons are more efficient than high-power pulsed klystrons. Also the rise and fall times of the thyratrons that discharge the line forming network are in order of microseconds further reducing the efficiency.

HIGHER PEAK POWER

The last cavity of the klystron and the klystron window are peak power limited. With superconducting cavities the peak energy is limited because there is a critical magnetic field above which superconductivity ceases, but this limit can be made very high. The storage capacity of a superconducting niobium spherical $TE_{nop}$ cavity with a 0.3 meter radius is greater than 100 J.

HIGHER REPETITION RATE

Because thyratrons take a long time to deionize, the pulses cannot occur less than 100 microseconds apart. Moreover, repetition rate or pulse width cannot be traded for peak power because klystrons are generally optimized at a fixed perveance.

AGILITY AND VERSATILITY

One can have a set of several pulses and one can shape the pulse by varying $Q_e$ during discharge. The latter is important if the load is a cavity. One can trade peak power for pulse repetition rate.

SPECIFIC APPLICATIONS OF RASP

1. Communication

Because of its sharp rise time and high repetition rate, RASP can be used for pulse position and pulse width modulation. For pulse position modulation the clock pulses are moved with respect to a fixed clock. For pulse width modulation k and $C_f$ are changed simultaneously so that $t_b$ changes from nearly $t_2$ to a small fraction of $t_2$. The energy contained in the pulse does not change. The ON/OFF switch in the QEK can be a varactor or a metal diaphragm actuated by piezomagnetic rod or a voice coil is indicated in FIGS. 5a and 5b.

2. Radar

Just as in pulse compression radar one illuminates the target with a long frequency-modulated long pulse and compresses the received echo into a narrow pulse so with RASP radar one illuminates the target with a PSK-modulated constant amplitude rf, essentially a pulse width equal to the period, and converts the received echo into narrow pulses. Thus, as with pulse compression, one obtains the resolution and accuracy of a short pulse with the detection capability of a long pulse except that with RASP the whole period is compressed and, hence, higher effective peak powers are possible. Also, the pulse rise time is sharper and there is not residual frequency modulation in the output pulse. RASP can also be used to code cw radar. A block diagram of a cw radar system with RASP is shown in FIG. 6a and a series of graphs showing the waveforms of the system are shown in FIGS. 6b to 6e.

PARTICLE ACCELERATORS

The high efficiency and relative ease of changing pulse width and repetition frequency of RASP makes it more suitable than conventional pulsers to drive particle accelerators that are required to accelerate single bunches of charges particles at specific intervals, such as particle accelerators used for stroboscopic radiography. If the accelerating structure is standing wave then one can change $Q_e$ during discharge and increase the efficiency of energy transfer into the accelerator section.

Although we considered radio frequencies only, RASP can also be realized at any frequency where the requisite components exist, such as low and optical frequencies.

While embodiments of the invention have been shown and described, further embodiments or combinations of those described herein will be apparent to those skilled in the art without departing from the spirit of the invention.

I claim:

1. A radio frequency storage pulser for converting a continous wave radio frequency input into a pulsed radio frequency output comprising:
   (a) separation means having first, second, third, and fourth ports, for transferring energy from said first port to said third and fourth ports during a first interval of a cycle and from said third and fourth ports to said second port during a second interval of a cycle;
   (b) phase shifting means coupled between said input and said first port for providing a signal at said first port and for changing the phase of the signal at said first port by 180° in response to a first control signal;

(c) first and second radio frequency storage devices coupled to said second port and third port, respectively;

(d) first and second $Q_e$ switch means for varying the coupling between said first and second radio frequency storage devices and said separation means in response to a second control signal; and (e) modulation means operatively coupled to said phase shift keyer and to said first and second $Q_e$ switch means for synchronously providing said first control signal to said phase shifting means and said second control signal to said first and second $Q_e$ switch means so that said first and second radio frequency storage devices accept energy during said first interval and deliver energy during said second interval;

whereby the output produced at said fourth port is a series of pulses of duration and period corresponding to said first and second intervals, the average power of said pulses being nearly as great as that of said input and the peak power of said pulses being substantially greater than that of said input.

2. The radio frequency storage pulser of claim 1 wherein said modulation means is adapted to vary the pulse width, pulse separation, or pulse frequency of said output.

3. The radio frequency storage pulser of claim 1 wherein the external Q's of said storage devices are chosen to maximize conversion efficiency.

4. The radio frequency storage pulser of claim 1 adapted to drive particle accelerators that generate high energy periodic bunches of particles.

5. The radio frequency storage pulser of claim 1 wherein said first and second radio frequency storage devices are superconducting.

6. The radio frequency storage pulser of claim 1 wherein said separation means is a 3 db directional coupler.

7. The radio frequency storage pulser of claim 1, and further comprising a radio frequency amplifier coupled between said pulse shifting means and said first port.

* * * * *